United States Patent [19]
Solomon

[11] 3,750,126
[45] July 31, 1973

[54] PROXIMITY DETECTOR
[75] Inventor: Elias E. Solomon, Duxbury, Mass.
[73] Assignee: Pyrotector, Incorporated, Hingham, Mass.
[22] Filed: Feb. 3, 1972
[21] Appl. No.: 223,074

Related U.S. Application Data
[63] Continuation of Ser. No. 18,654, March 11, 1970, abandoned.

[52] U.S. Cl............... 340/258 C, 307/116, 317/146
[51] Int. Cl. ........................................... G08b 13/26
[58] Field of Search .................... 340/258 C, 258 R; 317/146; 307/116

[56] References Cited
UNITED STATES PATENTS
3,255,380   6/1966   Atkins et al..................... 340/258 C
3,200,306   8/1965   Atkins et al..................... 340/258 C

*Primary Examiner*—David L. Trafton
*Attorney*—Robert E. Ross

[57] ABSTRACT

The increase in capacitance with decrease in distance between an object and an approaching person or vehicle is used as part of the input signal to a capacitance multiplying device, the output of which provides a signal to a detection or alarm circuit. The small increase in capacitance in the input circuit provides in effect a larger increase in capacitance in a portion of the output circuit, which causes a reduction in voltage applied to the detection device.

7 Claims, 3 Drawing Figures

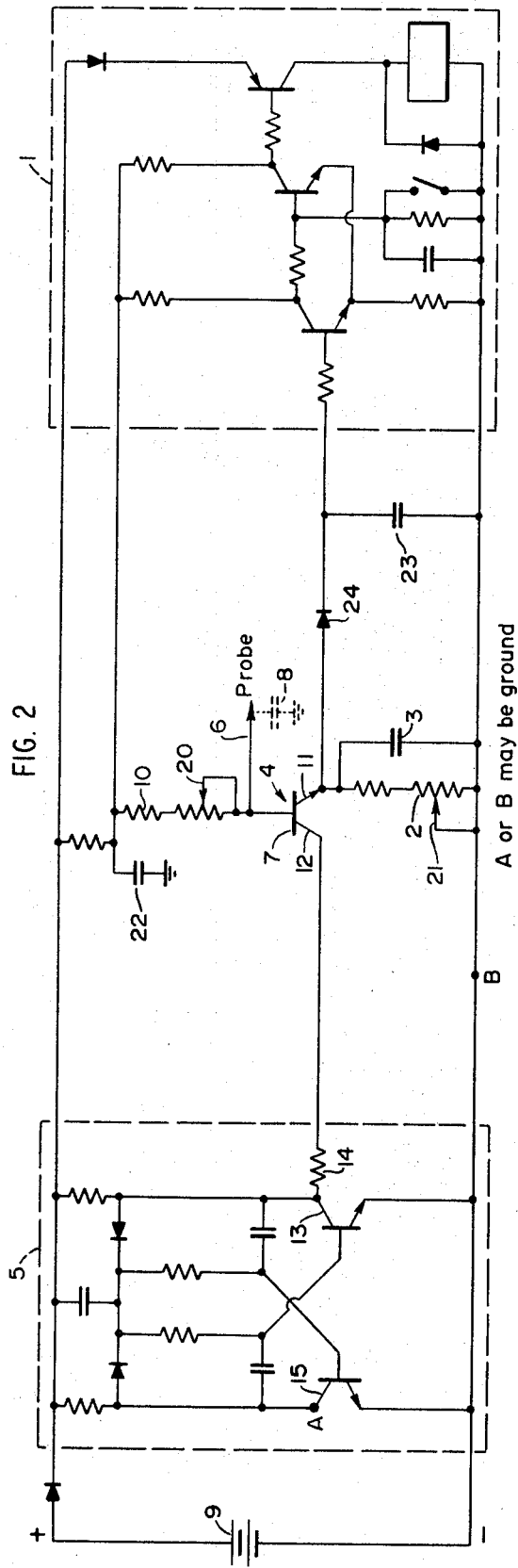
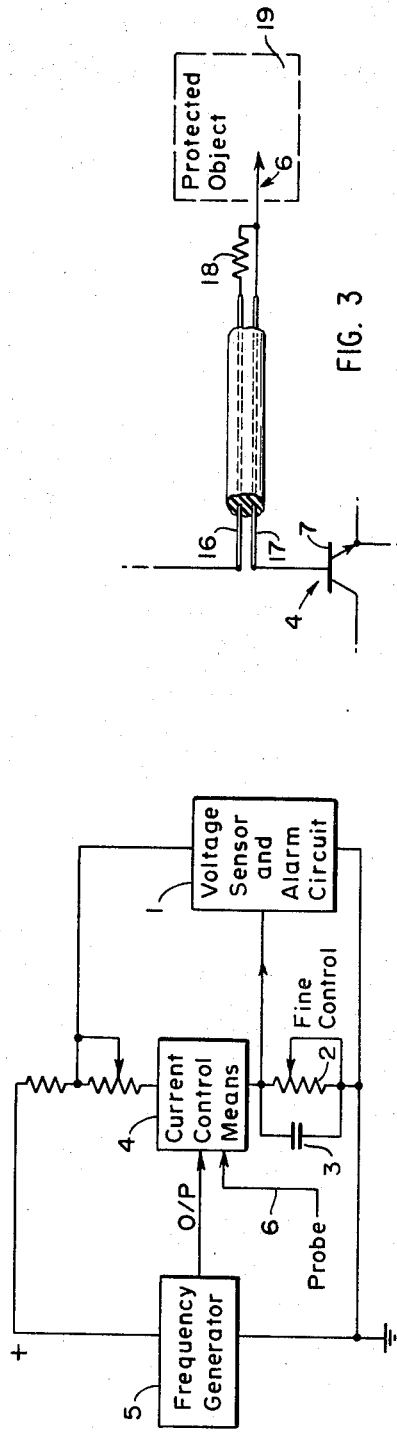
INVENTOR
ELIAS E. SOLOMON

PROXIMITY DETECTOR

CROSS REFERENCE TO COPENDING APPLICATION

This application in a continuation of application Ser. No. 18654 filed Mar. 11, 1970, and now abandoned.

FIELD OF THE INVENTION

The invention relates to an electrical circuit for the detection of a change in capacitance between a probe and a reference element. One application of such a device is the detection of the approach of an object such as a person or vehicle to an object being protected or monitored.

DESCRIPTION OF THE PRIOR ART

Proximity detectors are known which utilize the increase in capacitance between ground and an object suitably insulated from ground that results when a person or vehicle approaches the object. Proximity detectors in commercial use utilize a tuned circuit, in which resonance of the circuit is destroyed by the change in capacitance resulting from a body approaching the object being protected. Such devices have a number of disadvantages in that they are expensive to manufacture, they must be tuned to a particular installation, and they are subject to false alarms due to drift of the circuit with changing temperature and humidity.

SUMMARY OF THE INVENTION

The present invention relates to a proximity detector in which a transistor amplifier connected in emitter-follower configuration is utilized to detect a small change in capacitance by means of the capacitance multiplying effect of such a circuit. Current pulses are applied to the collector of the transistor and the pulsed output from the emitter is applied to an integrating circuit which provides an input to a voltage responsive alarm actuating device. An input current applied to the base of the transistor normally maintains conduction in the collector-emitter path at a predetermined level. A probe connected to the object to be protected is also connected to the base as an input signal. With the approach of a person, for example, to the object to which the probe is connected, the current flow to the base from the input is reduced, since a portion of the current is by-passed to the probe. The reduced current flow to the base causes a much larger reduction in current flow in the emitter-collector path, thereby lowering the input voltage to the alarm actuating device.

BRIEF DESCRIPTION OF THE DRAWING

FIG. 1 is a schematic diagram in block form illustrating the components of one embodiment of the invention;

FIG. 2 is a schematic diagram illustrating in more detail the components of one embodiment of the invention;

FIG. 3 is a schematic diagram of a probe for use with the circuit of FIG. 2.

DESCRIPTION OF A PREFERRED EMBODIMENT

Referring to FIG. 1 there is illustrated a block diagram of a proximity detector embodying the features of the invention in which a voltage sensor is designed to trigger an alarm or other signal if the voltage input thereto falls below a certain level. The input signal to the voltage sensor is the voltage appearing across the parallel connection of a resistor 2 and condensor 3 to which current is supplied by other parts of the circuit. The voltage sensor input is essentially the voltage across the capacitance 3 and this may be adjusted by the resistor 2 which determines the rate at which current leaks from the capacitance 3. The voltage across the capacitance 3 is dependent upon the current in the pulses delivered to it, and the magnitude of this current is determined by the current control means which, in the illustrated embodiment, is an emitter-follower transistor. By means of a pulse generator 5, DC pulses are periodically applied to the collector of the transistor, so that the output from the emitter has a pulsed current, the magnitude of the pulses in the output depending on the input signal to the base, now to be described.

Referring to FIG. 2 of the drawing, the base 7 of the transistor is connected to a power supply 9 through a resistance 10, which may be a battery supplying 6 volts, the positive side of which is applied to the base through a resistance 10 of 100,000 ohms. The base 7 is also connected to a probe 6 which is connected to an object to be monitored or guarded, and thus the base 7 is in effect connected to ground through the capacitance of the object. This capacitance 8 will increase on the approach of a person to the object, and this change in capacitance is the input signal to the base.

The bias on the base 7 is thus a voltage with respect to ground which is 6 volts less the voltage drop across the resistance 10 at normal base currents when the transistor is conducting. The resistance 10 is sufficiently high to limit the current flowing therethrough to a value such that when the capacitance 8 increases, an appreciable portion of the current through the resistor 10 is diverted from the base to charge the increased capacitance 8. The change in capacitance 8 is therefore the variable portion of the input signal.

The emitter 11 is connected to ground through the parallel connection of the resistance 2 and the capacitor 3, and to the voltage sensor 1. The voltage applied to the voltage sensor is therefore determined by the voltage across the capacitor 3. In operation, the transistor 4 passes square waves from the collector 12 to the emitter 11 thereby charging the capacitor 3. This charge leaks off through the resistance 2 continuously so that a continuous supply of pulses is needed to maintain the charge on the capacitor 3. During normal operation the capacitance 8 of the object being protected is also charged by the power supply 9. Charge is supplied to the capacitor 3 only during the "on" period of the pulse generator. During the "off" period, the voltage at the emitter drops, however the voltage from the charged capacitor 8 maintains sufficient voltage at the emitter 11 and hence at the input of the sensing device to prevent the sensing device from actuating the alarm.

However when the current in the pulses is reduced by a reduction in base current caused by an increase in capacitance 8, the voltage across capacitor 3 drops and consequently the voltage at the voltage sensor drops. If the voltage drop is great enough, the alarm is sounded.

A portion of the resistance 10 may be variable, as shown at 20, to provide a coarse control, and a portion of the resistance 2 may be variable, as shown at 21, to provide a fine control. The voltage level is suitably adjusted initially to maintain a predetermined voltage at the voltage sensor input. When additional capacitance is provided between the probe and ground, as by a person approaching the object to which the probe is connected, the additional capacitance is in effect multiplied by the $\beta$ of the transistor, which has the same effect as if a much larger capacitance had been introduced between emitter and ground. The impedence between emitter and ground is therefore in effect reduced, reducing the voltage between emitter and ground.

Integrating means may be connected across the input to the voltage sensor, which may comprise a capacitor 23, which is prevented from discharging except to the voltage sensor by a diode 24.

The invention comprehends the use of any suitable current amplifier as the current control means, and although a simple emitter-follower is illustrated, the scope of the invention includes transistors connected in compound configuration or thermionic devices.

To protect the probe leads from malicious interference and to monitor continuity, the probe may include two leads 16 and 17 terminated by a resistor 18 as shown in FIG. 3. The end of the resistor 18 which is connected to the base 7 is connected to the object 19 to be protected. Hence if either of the two leads 16 or 17 is broken, no base current will flow and the alarm will be actuated.

Since certain obvious changes may be made in the illustrated embodiment of the invention, it is intended that all matter contained herein be interpreted in an illustrative and not a limiting sense.

I claim:

1. A proximity detector, comprising a voltage sensor responsive to a change in input voltage to actuate an alarm, a pulse generator for applying pulses to said sensor, and means between the pulse generator and the voltage sensor for controlling the magnitude of said pulses, said means including a gating device having a control electrode responsive to a change in applied voltage to effect a change in current flow between two other electrodes, said two other electrodes being connected between the pulse generator and the alarm actuating device, and a probe connected to said control electrode for connection to an object to be protected, whereby a change in the capacitance of said object will cause a change in applied voltage at said control electrode to effect a change in the magnitude of said pulses.

2. A proximity detector as set out in claim 1 in which said gating device is a transistor connected in emitter-follower configuration.

3. A proximity detector as set forth in claim 1 in which said gating device is a thermionic device connected in cathode follower configuration.

4. A proximity detector as set out in claim 1 in which means is provided for charging the capacitance of said object, whereby during the off period of the pulse generator, the voltage of the capacitance of said object maintains sufficient voltage at the input of the voltage sensor to prevent an alarm from being actuated.

5. A proximity detector comprising a voltage responsive device for actuating an alarm, a pulse generator for applying pulses to said device, and current control means between said device and said pulse generator to control the magnitude of said pulses applied to said device, said current control means comprising a gating device having a control electrode responsive to a change in current to effect a change in current flow between two other electrodes, said two other electrodes being connected between the pulse generator and the voltage responsive alarm device, means supplying a current flow to said control electrode, and a probe connected to said control electrode for connection to an object to be protected, whereby an increase in capacitance of the object to which the probe is connected will cause current to flow to said object which will reduce the current flow to said control electrode and thereby reduce the magnitude of said pulses.

6. A proximity detector, comprising a voltage sensor responsive to a change in voltage to operate a circuit component, a voltage integrating device having its output connected to the input of the voltage sensor, a pulse generator for applying current pulses to said integrating device to normally maintain a predetermined voltage at said voltage sensor, and current control means between the pulse generator and the integrating circuit, said current control means comprising a transistor connected in emitter-follower configuration whereby the pulses pass from the pulse generator through the collector-emitter path of the transistor and provide pulses at the integrating circuit, and a current controlling input connected to the base of said transistor, said input comprising a bias current to normally allow a pre-determined current flow in the collector-emitter path, and a probe for connection to an object to be protected, whereby an increase in capacitance between the object and ground will cause less bias current to flow to the base, whereby the current in the collector emitter circuit is reduced causing a reduction in current to the integrating device, whereby less voltage appears at the voltage sensor.

7. A proximity detector, comprising a transistor having base, emitter, and collector electrodes, means for supplying a voltage to the base from a high impedance source of a polarity such that conduction can occur in the emitter-collector path, means for supplying pulses to the emitter-collector path, means for integrating the pulsed output from the emitter-collector path into a voltage signal input to an alarm actuating device to maintain said device in the non-alarm condition, said alarm actuating device being responsive to a drop in signal voltage to actuate said alarm, and probe means connected to the base, whereby when the capacitance between the probe and ground increases, the voltage at the base decreases reducing the magnitude of the output pulses and thereby lowering the signal voltage to the alarm actuating device.

* * * * *